(12) United States Patent
Tanaami et al.

(10) Patent No.: US 7,567,388 B2
(45) Date of Patent: Jul. 28, 2009

(54) OPTICAL SYSTEM AND OPTICAL MICROSCOPE

(75) Inventors: Takeo Tanaami, Tokyo (JP); Yumiko Sugiyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 54 days.

(21) Appl. No.: 11/951,042

(22) Filed: Dec. 5, 2007

(65) Prior Publication Data

US 2008/0144194 A1 Jun. 19, 2008

Related U.S. Application Data

(62) Division of application No. 11/416,111, filed on May 3, 2006, now Pat. No. 7,446,957.

(30) Foreign Application Priority Data

May 10, 2005 (JP) .................. P. 2005-137132

(51) Int. Cl.
  *G02B 13/08* (2006.01)
  *G02B 9/06* (2006.01)
(52) U.S. Cl. .................... 359/668; 359/794
(58) Field of Classification Search ............ 359/668, 359/754–757, 759, 760, 763, 764, 767–769, 359/771, 772, 779, 780, 784, 791–794
  See application file for complete search history.

(56) References Cited

U.S. PATENT DOCUMENTS

| 5,465,178 | A | 11/1995 | Nakai et al. |
| 6,201,229 | B1 | 3/2001 | Tawa et al. |
| 2002/0166952 | A1 | 11/2002 | Tanaka et al. |
| 2003/0053221 | A1 | 3/2003 | Coufal et al. |
| 2003/0218805 | A1* | 11/2003 | Yamakawa et al. .......... 359/668 |
| 2004/0084607 | A1 | 5/2004 | Ichihashi et al. |

FOREIGN PATENT DOCUMENTS

| JP | 63-188115 A | 8/1988 |
| JP | 3-75612 A | 3/1991 |
| JP | 03-092815 A | 4/1991 |
| JP | 11-95109 A | 4/1999 |
| JP | 11-258544 A | 9/1999 |
| JP | 2001-228402 A | 8/2001 |

OTHER PUBLICATIONS

Extended European Search Report Dated May 11, 2007.

* cited by examiner

*Primary Examiner*—Darryl J Collins
(74) *Attorney, Agent, or Firm*—Sughrue Mion, PLLC

(57) ABSTRACT

An optical system which corrects an intensity distribution of incident light to a flat intensity distribution includes: a first lens group which includes at least one lens and has a positive refracting power; a second lens group which includes at least one lens and has a negative refracting power, the second lens group being positioned behind the first lens group in a direction of the incident light; and a third lens group which includes at least one lens and has a positive refracting power, the third lens group being positioned behind the second lens group in the direction of the incident light. In the optical system, the incident light is collimated, and the intensity distribution of the incident light is corrected to the flat intensity distribution by spherical aberrations of the first lens group, the second lens group and the third lens group.

7 Claims, 5 Drawing Sheets

OPTICAL SYSTEM AND OPTICAL MICROSCOPE

This is a divisional of application Ser. No. 11/416,111 filed May 3, 2006 now U.S. Pat. 7,446,957. The entire disclosure of the prior application, application Ser. No. 11/416,111 is hereby incorporated by reference.

This application claims foreign priority based on Japanese Patent application No. 2005-137132, filed May 10, 2005, the content of which is incorporated herein by reference in its entirety.

BACKGROUND OF THE INVENTION

1. Field of the Invention

The present invention relates to an optical system for correcting a light intensity distribution, and more particularly to an optical system for correcting the intensity distribution of divergent light to a uniform distribution.

2. Description of the Related Art

One example of an optical microscope is a confocal microscope. The confocal microscope can obtain slice images of a sample without making the sample into slice portions, and a correct three-dimensional image of the sample can be constructed from the slice images. Therefore, the confocal microscope is used in, for example, physiological reaction observation and morphology observation of living cells in the fields of biology and biotechnology, or surface observation of an LSI (large-scale intergration) in the field of semiconductors.

In such a confocal microscope, plural beam spots are produced from laser light, the sample is irradiated with the beam spots, and the sample is observed on the basis of fluorescence or reflected light from the sample. In this case, distribution uniformity of the intensity of the laser light (a Gaussian distribution is obtained with respect to a plane perpendicular to the optical axis) affects the intensities of the beam spots. In order to obtain only a uniform light flux in the vicinity of the optical axis of the laser light, therefore, an aperture plate having an aperture is disposed, and only a light flux which is passed through the aperture plate is used.

Also a confocal scanner has been disclosed in which a light intensity distribution correcting filter is placed between a collimating lens that converts divergent light emitted from a fiber end to parallel light, and an aperture plate (for example, see JP-A-2001-228402). The light intensity distribution correcting filter flattens the intensity distribution of light which is passed through the aperture of the aperture plate among incident light having a Gaussian light intensity distribution, and cuts off light other than the light passed through the aperture of the aperture plate.

In a configuration where the light intensity is corrected in this way, the quantity of available light is small, and therefore, in order to sufficiently irradiate a sample, a light source having a correspondingly large output power must be used. This causes stray light to be excessively increased. Therefore, the configuration is not suitable for a case where weak light is handled, such as fluorescence observation.

By contrast, in a configuration where a sample can be irradiated with light of a uniform intensity without reducing the light quantity, a light intensity uniformalizing lens is used (for example, see JP-A-11-95109).

FIG. 6 is a diagram of a confocal microscope disclosed in JP-A-11-95109.

Referring to FIG. 6, light emitted from a point light source 61 such as an optical fiber end is converted to parallel light by a collimating lens 62, the intensity distribution of the parallel light is uniformalized by a light intensity uniformalizing lens 63, and the uniformalized light is incident on a collecting disk 66 through an aperture 65 of an aperture plate 64. The point light source 61 is placed at the front focal point (focal length f) of the collimating lens 62.

A plurality of microlenses (for example, Fresnel lenses) 66a are formed in the collecting disk 66, and a plurality of pinholes 67a are spirally formed in multiple rows in a pinhole disk 67. The collecting disk 66 and the pinhole disk 67 are coupled to each other so that the pinholes 67a are located in the respective focal positions of the microlenses 66a.

Laser light which is incident on the collecting disk 66 is collected by the microlenses 66a, and then passed through a beam splitter (not shown) to be collected to the pinholes 67a. The light which is passed through the pinholes 67a is collected by an objective lens 68, and then is irradiated on a sample surface 69.

The return light from the sample surface 69 is again passed through the objective lens 68 and the pinhole disk 67, and then reflected by the beam splitter (not shown) to enter a camera (not shown) via an imaging lens (not shown). An image of the sample surface 69 is formed on an image receiving surface of the camera.

In this configuration, the collecting disk 66 and the pinhole disk 67 are integrally rotated by a member 70, and the sample surface 69 is optically scanned (raster scanned) by the plural pinholes 67a, whereby a surface image of the sample surface 69 can be observed through the camera.

The light intensity uniformalizing lens 63 is a lens which maintains the quantity of the incident light entering from the collimating lens 62, and which uniformalizes the intensity of the incident light (for example, see JP-A-11-258544).

The light intensity uniformalizing lens 63 is placed between the collimating lens 62 and the aperture plate 64. The incident light entering the light intensity uniformalizing lens 63 has a Gaussian light intensity distribution, so that the intensity of the incident light is strongest in the vicinity of the optical axis, and the intensity is weaker as further separating from the optical axis. In the light intensity uniformalizing lens 63, a center portion where the incident light is dense is formed as a diffusing lens (concave lens) which diffuses parallel light, and a peripheral portion where the incident light is not dense is formed as a converging lens (convex lens) which converges parallel light. The light intensity uniformalizing lens 63 does not cut off light in a portion of the Gaussian distribution where the light intensity is low (the peripheral portion of the lens), and hence can maintain about 70 to 90% of the quantity of the incident light, thereby preventing a loss of the light quantity from occurring. The light emitted from the light intensity uniformalizing lens 63 is parallel light in which the light intensity distribution is substantially uniform.

In another laser light intensity distribution-converting optical system, by an afocal optical system of first and second groups (four-lens/two-group configuration) each configured by two lenses and having a positive refracting power, the light intensity distribution of an emission light flux which is parallel light is flattened, and the diameter of a flat distribution region is continuously changed by zooming (for example, see JP-A-3-75612).

In the configuration which is disclosed in JP-A-11-95109, and in which the light intensity distribution is uniformalized, however, the dedicated lens which converts the light intensity distribution, such as that disclosed in JP-A-11-258544 is used. Therefore, the configuration is produced with using a dedicated molding die, and a process of checking the curvature requires man-hours, resulting in that the configuration is expensive. Furthermore, a modulation for coping with the case of a different NA (numerical aperture) of a light source, and a change of the diameter of output light are hardly conducted. In the above, the NA is defined as NA=nsin θ where n is the refractive index, and θ is the divergence angle.

In the optical system disclosed in JP-A-3-75612, usual spherical lenses are used, but the four-lens configuration is necessary. This configuration adversely affects the cost and the space.

SUMMARY OF THE INVENTION

The present invention has been made in view of the above circumstances, and provides a light intensity distribution correcting optical system and also an optical microscope using the optical system, in which a light intensity distribution of divergent light from a light source is uniformalized and the light use efficiency is improved. Also, in the light distribution correcting optical system, a difference in NA of the light source is easily absorbed, and the light distribution correcting optical system is lower in cost.

In some implementations, an optical system of the invention which corrects an intensity distribution of incident light to a flat intensity distribution, the optical system comprises:

a first lens group which includes at least one lens and has a positive refracting power;

a second lens group which includes at least one lens and has a negative refracting power, the second lens group being positioned behind the first lens group in a direction of the incident light; and a third lens group which includes at least one lens and has a positive refracting power, the third lens group being positioned behind the second lens group in the direction of the incident light.

In the optical system of the invention, the incident light is collimated, and the intensity distribution of the incident light is corrected to the flat intensity distribution by spherical aberrations of the first lens group, the second lens group and the third lens group.

In some implementations, an optical system of the invention which corrects an intensity distribution of incident light to a flat intensity distribution, the incident light having different divergence angles in X-direction and Y-direction of a plane, the optical system comprises:

a first lens group which includes at least one cylindrical lens, has a positive refracting power in a direction of a larger divergence angle of the divergence angles, and has no refracting power in a direction perpendicular to the direction of the larger divergence angle; and a second lens group which includes at least one cylindrical lens, has a positive refracting power in a direction of a smaller divergence angle of the divergence angles, and has no refracting power in a direction perpendicular to the direction of the smaller divergence angle, the second lens group being positioned behind the first lens group in a direction of the incident light.

In the optical system of the invention, the incident light is collimated, and the intensity distribution of the incident light is corrected to the flat intensity distribution by spherical aberrations of the first lens group and the second lens group.

In the optical system of the invention, the first lens group and the second lens group are in contact with each other.

In the optical system of the invention, the incident light is laser light or natural light.

In the optical system of the invention, the intensity distribution of the incident light is Gaussian distribution or Airy distribution.

In the optical system of the invention, the incident light is emitted from a point light source, and the point light source is an emission end of an optical fiber or a light emitting diode.

In the optical system of the invention, the incident light having different divergence angles in the X-direction and the Y-direction of the plane is emitted from a point light source, and the point light source is a laser diode.

In the optical system of the invention, an amount of the spherical aberrations is substantially equal to or more than 40 percent of a focal length of the first lens group.

In some implementations, an optical microscope of the invention in which a surface of a sample is irradiated with incident light from a light source by an objective lens, the optical microscope comprises:

the optical system of the invention, wherein the optical system collimates the incident light, and corrects the intensity distribution of the incident light to the flat intensity distribution by spherical aberrations of the first lens group and the second lens group (and the third lens group), thereby emitting the incident light to the objective lens.

The invention can attain the following effects.

According to the invention, it is possible to realize a light intensity distribution correcting optical system in which the light intensity distribution of divergent light from a light source is uniformalized, the light use efficiency is improved, and a difference in NA of the light source is easily absorbed, and which is lower in cost.

According to the invention, the intensity distribution of divergent light from a semiconductor laser diode or the like in which NAs in X-direction and Y-direction in a plane are different from each other can be uniformalized, and the divergent light from the light source can be used at a high efficiency.

According to the invention, it is possible to realize an optical system which requires a small space, and which is easy to handle.

According to the invention, it is possible to realize an optical microscope in which the light intensity distribution of divergent light from a light source is uniformalized, the light use efficiency is improved, and a difference in NA of the light source is easily absorbed, and which is lower in cost.

DESCRIPTION OF THE PREFERRED EMBODIMENTS

Figure 1:
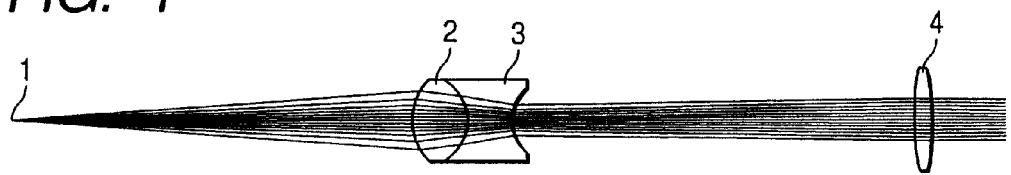
FIG. 1 is a diagram showing a first embodiment of a light intensity distribution correcting optical system of the invention.
Figure 6:
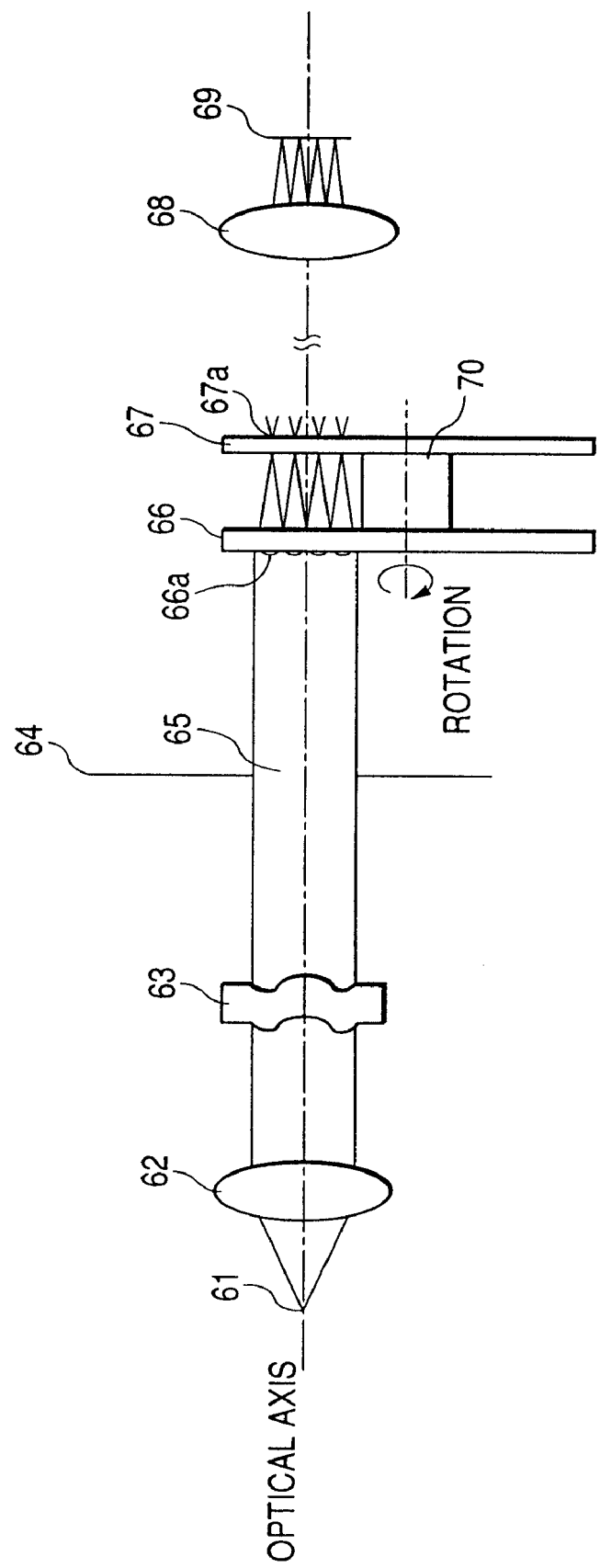
FIG. 6 is a diagram of a confocal microscope disclosed in a related art.

Hereinafter, the invention will be described in detail with reference to the accompanying drawings. FIG. 1 is a diagram showing a first embodiment of a light intensity distribution correcting optical system of the invention. The optical system of the embodiment is placed instead of the collimating lens and the light intensity uniformalizing lens of the confocal microscope described as the related example (FIG. 6).

Referring to FIG. 1, a light source 1 is a point light source such as a semiconductor laser diode (hereinafter, abbreviated as LD), a light emitting diode (hereinafter, abbreviated as LED), or an end face of an optical fiber, and emits divergent light. A first convex lens 2 refracts the divergent light from the light source 1 toward the optical axis by the positive refracting power to cause the light to be incident on a concave lens 3 while the beam diameter is reduced. The concave lens 3 refracts the light emitted from the first convex lens 2 toward the outside by the negative refracting power to form substantial parallel light. Because of the spherical aberrations of the lenses, the Gaussian distribution of the light intensity in the output from the light source is converted to a flat light intensity distribution.

A first lens group having a positive refracting power corresponds to the first convex lens, a second lens group having a negative refracting power corresponds to the concave lens, and a third lens group having a positive refracting power corresponds to the second convex lens. Each of the lens groups may be configured by plural lenses instead of a single lens.

Figure 2A:
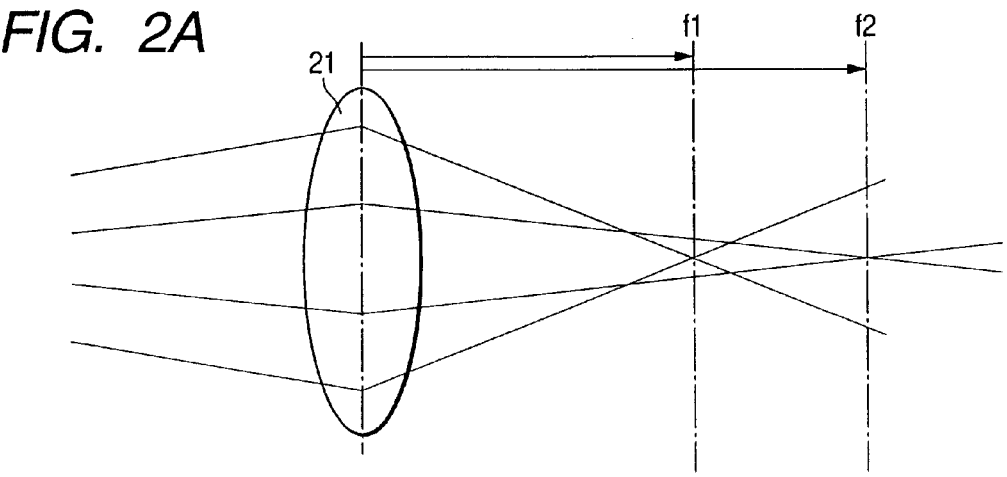
FIGS. 2A and 2B are diagrams each illustrating a spherical aberration of a lens.
Figure 2B:
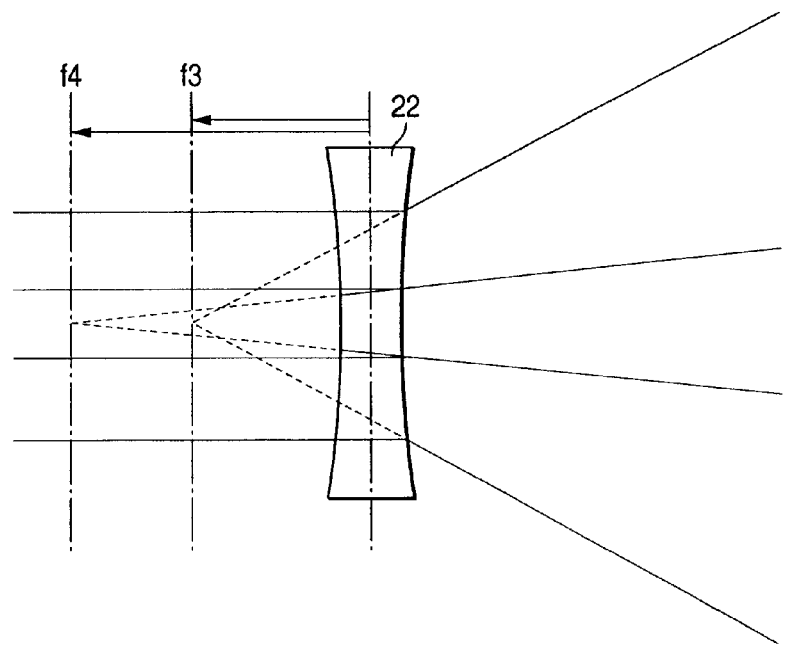

This will be described with reference to FIGS. 2A and 2B. FIGS. 2A and 2B are diagrams each illustrating a spherical aberration of a lens.

Referring to FIG. 2A, in a convex lens 21, a light flux incident on an outer periphery side of the lens is converged at a focal length f1 which is in the vicinity of the lens by the spherical aberration, and a light flux incident on an inner periphery is converged at a focal length f2 which is more remote than f1.

Referring to FIG. 2B, in a concave lens 22, by the spherical aberration, a light flux incident on an outer periphery side of the lens is caused to have a larger divergence angle, and a light flux incident on an inner periphery is caused to have a smaller divergence angle. In FIG. 2B, a focal length f3 or f4 indicates the distance to a point where extension lines (broken lines) of a light flux diverging when parallel light is incident on the lens converge. Because of the spherical aberration, the focal length is short (f3) in the outer periphery of the concave lens 22, and long (f4) in the inner periphery.

Returning to FIG. 1, in the first convex lens 2, because of the spherical aberration, the light flux in a center portion where the light intensity is strong is substantially parallel, and that in a peripheral portion where the light intensity is weak is collected to the center portion.

Since the whole beam diameter is reduced by the first convex lens 2, beams are incident on the inner side of the concave lens 3, and hence the spherical aberration of the concave lens 3 is weak. Therefore, the concave lens can convert the whole beams to substantial parallel light, and flatten the light intensity distribution. The second convex lens 4 enlarges the reduced beam diameter to enable a zooming operation. In the invention, the light intensity distribution which is more uniform is realized by the combination of the spherical aberrations of the first convex lens 2, the concave lens 3, and the second convex lens 4. In this case, when the first convex lens has a spherical aberration of about 40% or more of the composite focal length, such an effect can be expected.

Figure 3A:
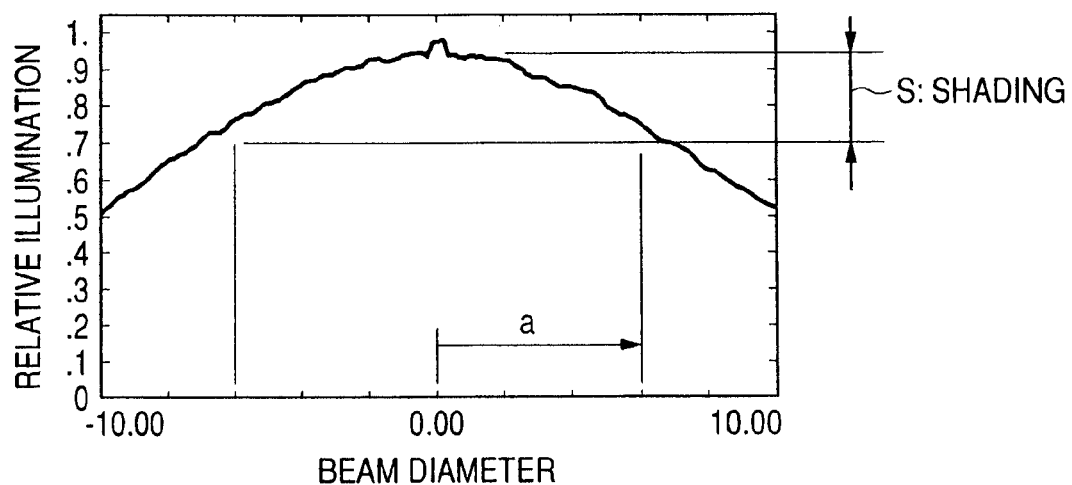
FIGS. 3A and 3B are views showing effects of a light intensity distribution correction in a first embodiment.
Figure 3B:
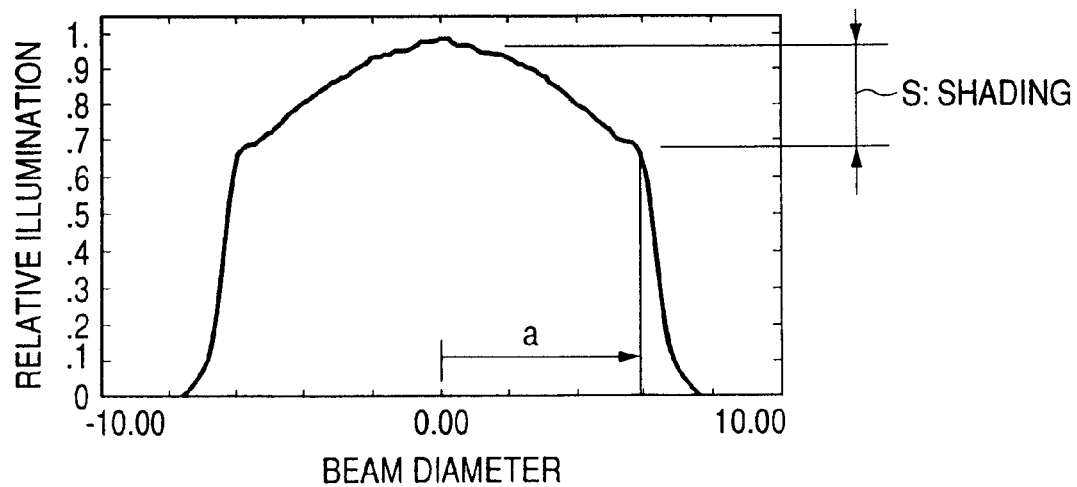

FIGS. 3A and 3B are views showing effects of the light intensity distribution correction in the first embodiment.

In FIGS. 3A and 3B, the vertical axis indicates the relative intensity of a beam, and the horizontal axis indicates the beam diameter. The incident light is divergent light emitted from an end face of an optical fiber of NA=0.09.

FIG. 3A shows the intensity distribution (Gaussian distribution) of a beam before the light intensity distribution correction. From the figure, it will be seen that a peak of the intensity is at the center of the beam, and the intensity is more attenuated as advancing toward the periphery.

By contrast, FIG. 3B shows the intensity distribution of a beam after the light intensity distribution correction. From the figure, it will be seen that the light intensity is steeply attenuated depending on the distance a from the center of the beam, but the distribution is corrected so as to be substantially uniform in a required visual field 2a.

Even when the light intensity distribution is corrected, the value of shading S indicated by the difference between the beam intensity at the peak (the center of the beam) and that at a point of the distance a from the center is approximately identical.

From this result, the beam intensity distribution is in a state where the distribution is flattened within the allowable shading S, and the efficiency of incidence into an aperture (the visual field diameter 2a), which, before correction, is about 22% of the quantity of the light emitted from the fiber, is about 58% after correction, or improved by 2.6 times.

In the embodiment, the first convex lens 2 and the concave lens 3 are close to each other. Alternatively, a space may be provided between the lenses. When the lenses are bonded together, however, the required space is small and the optical system is easy to handle.

The light source is not restricted to an end face of an optical fiber emitting divergent light, and may be another point light source such as an LD (laser diode) or an LED (light emitting diode). Alternatively, natural light may be used.

The intensity distribution of divergent light to be corrected is not restricted to a Gaussian distribution, and may be an Airy distribution.

As described above, divergent light can be collimated by the three spherical lenses, and the light intensity distribution can be corrected to be flat in a required visual field. Therefore, the cost is very low. Furthermore, the parameters of the lenses are changed in accordance with a difference in NA of a fiber or the like, thereby enabling the difference in NA to be easily absorbed. Moreover, beam expansion can be realized not by four lenses as in JP-A-3-75612, but by the three lenses.

An optical fiber has the same NA in a plane, but, in an LD, the NA in the X-direction of a plane is largely different from that in the Y-direction. In the configuration of the above-described first embodiment, it is difficult to uniformalize the intensity distribution of divergent light from such an LD in all directions in a plane. A configuration which can solve the problem will be described with reference to FIGS. 4A and 4B.

Figure 4A:
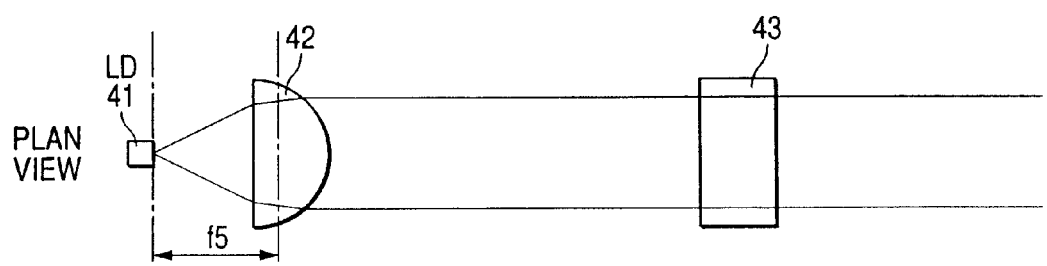
FIGS. 4A and 4B are diagrams showing a second embodiment of a light intensity distribution correcting optical system of the invention.
Figure 4B:
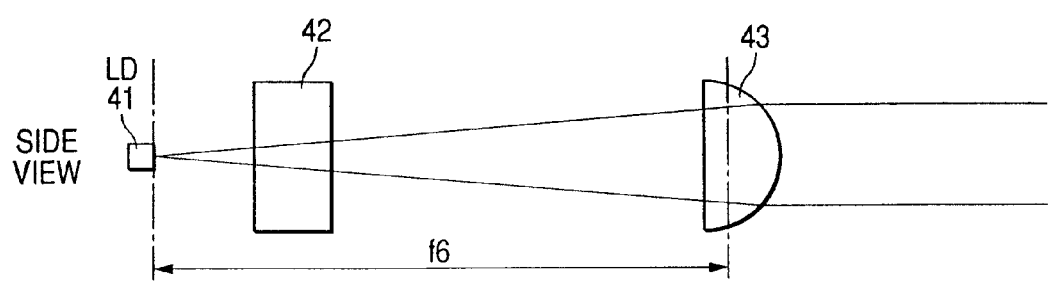

FIGS. 4A and 4B are diagrams showing a second embodiment of a light intensity distribution correcting optical system of the invention. The optical system of the embodiment is placed instead of the collimating lens and the light intensity uniformalizing lens of the confocal microscope described as the related example (FIG. 6).

FIG. 4A is a plan view, and FIG. 4B is a side view.

Referring to FIGS. 4A and 4B, a first cylindrical lens 42 has a short focal length f5, and a second cylindrical lens 43 has a long focal length f6. The light emission face of an LD 41 is located at a position corresponding to the focal lengths of the cylindrical lenses. The cylindrical lenses are rotated by 90° with respect to each other. This configuration is employed in order to use a characteristic in which light is refracted because a cylindrical lens has a curvature in a sectional direction along which the lens can be seen to be semicircular, and light is passed straight through the lens because the lens has no curvature in a sectional direction along which the lens can be seen to be rectangular.

Among divergent light from the LD 41, a light flux in a plane where the divergence angle is large is converted to parallel light by the first cylindrical lens 42, and than passed straight through the second cylindrical lens 43 which is rotated by 90°.

By contrast, a light flux in a plane where the divergence angle is small (a plane perpendicular to that where the divergence angle is large) is passed straight through the first cylindrical lens 42, and then converted to parallel light by the second cylindrical lens 43.

At this time, by the spherical aberrations of the cylindrical lenses, the divergent light from the light source having a different emission NA depending on the plane is converted to have a uniform light intensity distribution. In this case, when the second cylindrical lens has a spherical aberration of about 40% or more of the focal length f6, such an effect can be expected.

A first lens group configured by a cylindrical lens corresponds to the first cylindrical lens, and a second lens group corresponds to the second cylindrical lens.

Each of the lens groups may be configured plural cylindrical lenses in place of one cylindrical lens.

Figure 5A:
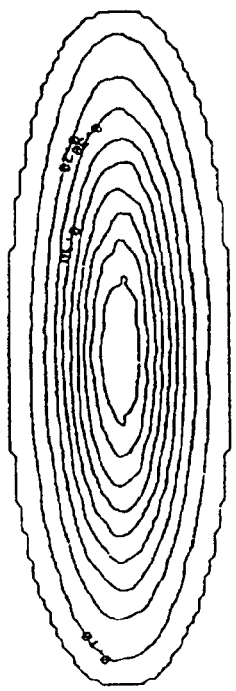
FIGS. 5A and 5B are views showing effects of a light intensity distribution correction in a second embodiment.
Figure 5B:
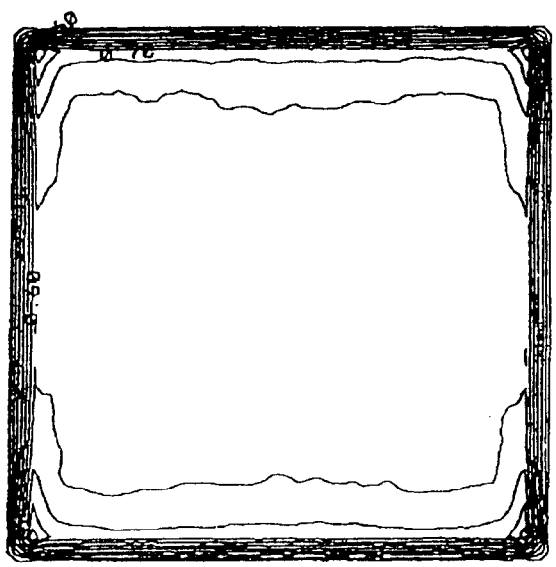

FIGS. 5A and 5B are views showing effects of the light intensity distribution correction in the second embodiment.

FIG. 5A shows the intensity distribution before the light intensity distribution correction, and FIG. 5B shows the intensity distribution after the light intensity distribution correction. In the figures, the intensity distribution is indicated by curves (horizontal curves) each configured by connecting points of the same intensity.

Because the NAs of the LD in the X- and Y-directions largely differ from each other, the beam width in the X-direction is different from that in the Y-direction. Therefore, the intensity distribution of FIG. 5A showing the distribution before the correction, has an oval shape. The horizontal curves show that the light intensity distribution is a Gaussian distribution.

By contrast, FIG. 5B shows the intensity distribution after the correction in which the beam width in the X-direction is equal to that in the Y-direction. The horizontal curves are dense only in the outer periphery, and show that the light intensity distribution is uniformalized.

A result that a ratio of light quantities before and after the correction is improved by 4.5 times in actual measurement values is obtained.

From the above, divergent light from an LD or the like in which NAs in X- and Y-directions in a plane are largely different can be collimated, the intensity distribution can be uniformalized in a required visual field, and divergent light from a light source can be used at a high efficiency.

In the embodiment, the intensity distribution of divergent light to be corrected is not restricted to a Gaussian distribution, and may be an Airy distribution.

The invention is not restricted to the embodiments, and includes many changes and modifications without departing the spirit of the invention.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An optical system which corrects an intensity distribution of incident light to a flat intensity distribution, the incident light having different divergence angles in X-direction and Y-direction of a plane, the optical system comprising:
   a first lens group which includes at least one cylindrical lens, has a positive refracting power in a direction of a larger divergence angle of the divergence angles, and has no refracting power in a direction perpendicular to the direction of the larger divergence angle; and
   a second lens group which includes at least one cylindrical lens, has a positive refracting power in a direction of a smaller divergence angle of the divergence angles, and has no refracting power in a direction perpendicular to the direction of the smaller divergence angle, the second lens group being positioned behind the first lens group in a direction of the incident light.

2. The optical system according to claim 1, wherein the incident light is collimated, and the intensity distribution of the incident light is corrected to the flat intensity distribution by spherical aberrations of the first lens group and the second lens group.

3. The optical system according to claim 1, wherein the incident light is laser light or natural light.

4. The optical system according to claim 1, wherein the intensity distribution of the incident light is Gaussian distribution or Airy distribution.

5. The optical system according to claim 1, wherein the incident light having different divergence angles in the X-direction and the Y-direction of the plane is emitted from a point light source, and the point light source is a laser diode.

6. The optical system according to claim 2, wherein an amount of the spherical aberrations is substantially equal to or more than 40 percent of a focal length of the first lens group.

7. An optical microscope in which a surface of a sample is irradiated with incident light from a light source by an objective lens, the optical microscope comprising:
   the optical system according to claim 1,
   wherein the optical system collimates the incident light, and corrects the intensity distribution of the incident light to the flat intensity distribution by spherical aberrations of the first lens group and the second lens group, thereby emitting the incident light to the objective lens.

* * * * *